(12) United States Patent
Smith et al.

(10) Patent No.: US 8,881,876 B2
(45) Date of Patent: Nov. 11, 2014

(54) FORCE-CONTROLLING HYDRAULIC DEVICE

(75) Inventors: Malcolm C. Smith, Cambridge (GB);
Neil E. Houghton, Cambridge (GB);
Peter J. G. Long, Cambridge (GB);
Anthony Richard Glover, Surrey (GB)

(73) Assignees: Cambridge Enterprise Limited, Cambridge (GB); McLaren Racing Limited, Surry (GB)

( * ) Notice: Subject to any disclaimer, the term of this patent is extended or adjusted under 35 U.S.C. 154(b) by 123 days.

(21) Appl. No.: 13/366,591

(22) Filed: Feb. 6, 2012

(65) Prior Publication Data
US 2012/0199428 A1  Aug. 9, 2012

Related U.S. Application Data
(63) Continuation of application No. PCT/GB2010/001491, filed on Aug. 6, 2010.

(30) Foreign Application Priority Data

Aug. 6, 2009 (GB) .................................. 0913759.7

(51) Int. Cl.
| F16D 57/02 | (2006.01) |
| F16F 9/34 | (2006.01) |
| F16F 7/10 | (2006.01) |
| F16F 9/32 | (2006.01) |

(52) U.S. Cl.
CPC ............. F16F 9/3405 (2013.01); F16F 7/1034 (2013.01); F16F 9/3235 (2013.01)
USPC .......................................... 188/293; 188/312

(58) Field of Classification Search
USPC .................. 188/290, 292, 301, 305, 312, 293
See application file for complete search history.

(56) References Cited

U.S. PATENT DOCUMENTS

| 1,952,902 | A | | 3/1934 | Barros | |
| 3,656,633 | A | * | 4/1972 | Ostwald | .......................... 213/43 |
| 3,795,390 | A | * | 3/1974 | Kendall et al. | .................. 267/33 |
| 4,425,836 | A | | 1/1984 | Pickrell | |
| 5,257,680 | A | | 11/1993 | Corcoran et al. | |

(Continued)

FOREIGN PATENT DOCUMENTS

| DE | 1077006 | 11/1954 |
| DE | 19834316 | 5/2000 |

(Continued)

OTHER PUBLICATIONS

International Search Report and Written Opinion in counterpart International Application No. PCT/GB2010/001491, mailed Nov. 4, 2010.

*Primary Examiner* — Pamela Rodriguez
(74) *Attorney, Agent, or Firm* — Edell, Shapiro and Finnan LLC

(57) ABSTRACT

A device for use in the control of mechanical forces is provided. The device includes first and second terminals for connection to components in a system for controlling mechanical forces and independently moveable. The device further comprises a hydraulic device connected between the terminals and containing a liquid. The hydraulic device is configured to produce upon relative movement of the terminals, a liquid flow to generate an inertial force due to the mass of the liquid to control the mechanical forces at the terminals such that they are substantially proportional to the relative acceleration between the terminals.

12 Claims, 2 Drawing Sheets

(56) References Cited

U.S. PATENT DOCUMENTS

| | | | |
|---|---|---|---|
| 5,487,454 A * | 1/1996 | Klembczyk et al. | 188/298 |
| 6,811,168 B2 * | 11/2004 | Acker et al. | 280/124.158 |
| 7,316,303 B2 | 1/2008 | Smith | |
| 2004/0104522 A1 * | 6/2004 | Wolf et al. | 267/64.11 |
| 2005/0034943 A1 | 2/2005 | Smith | |

FOREIGN PATENT DOCUMENTS

| | | |
|---|---|---|
| DE | 102006009631 A1 | 12/2006 |
| GB | 786839 | 11/1957 |
| GB | 2044882 | 10/1980 |
| WO | 0058642 A1 | 10/2000 |
| WO | 03005142 A1 | 1/2003 |

\* cited by examiner

FORCE-CONTROLLING HYDRAULIC DEVICE

CROSS REFERENCE TO RELATED APPLICATIONS

This application is a continuation of International Application No. PCT/GB2010/001491, filed on Aug. 6, 2010, entitled "Force-Controlling Hydraulic Device," which claims priority under 35 U.S.C. §119 to Application No. GB 0913759.7 filed on Aug. 6, 2009, entitled "Force-Controlling Hydraulic Device," the entire contents of which are hereby incorporated by reference.

FIELD OF THE INVENTION

This invention relates to a device using fluids for controlling mechanical forces such as vibrational forces.

BACKGROUND

Force-controlling devices are used for example in vehicle suspension systems. Vehicle suspension systems typically employ passive suspension systems, such as a spring in parallel with a damper. A problem with such systems however is that the optimization of the various performance requirements is limited due to the large masses required in practice to exploit inertial forces. The device of U.S. Pat. No. 7,316,303 addresses this problem by providing a component for building a suspension system with any desired mechanical impedance, but with the overall mass of the suspension system being kept small.

The device disclosed in U.S. Pat. No. 7,316,303 typically consists of a linear to rotary transducer, connected to a flywheel. Several variations of this device have been proposed, some including for example the use of ball screws or racks and pinions. One disadvantage of these is that there is a considerable number of moving parts.

The present invention therefore seeks to provide a simplified device wherein the number of moving parts is greatly reduced.

SUMMARY

According to the present invention, there is provided a device for use in the control of mechanical forces, the device comprising:

first and second terminals for connection to components in a system for controlling mechanical forces and independently moveable; and a hydraulic device connected between the terminals and containing a liquid, the hydraulic device being configured to produce upon relative movement of the terminals, a liquid flow to generate an inertial force due to the mass of the liquid to control the mechanical forces at the terminals such that the mechanical forces are substantially proportional to the relative acceleration between the terminals.

Accordingly, the present invention provides a device wherein the moving liquid acts as storage for kinetic energy. An advantage of the device according to the present invention is its tractability in production.

The hydraulic device may further comprise a housing defining a chamber for containing the liquid, the housing being attached to one of the terminals; and a piston attached to the other terminal and movable within the chamber such that the movement of the piston causes the liquid flow along at least one flow path.

The at least one flow path may be helical. Accordingly, the present invention provides a device wherein a liquid acts both as the linear to rotary transducer as well as storage for rotational kinetic energy.

The at least one flow path may be provided either outside or inside the chamber.

The device may further comprise an adjusting mechanism to control the mechanical forces at the terminals such that they are proportional to the relative acceleration between the terminals, the proportionality term being a fixed constant.

The device may further comprise a limiter device configured to restrict the extent of relative movement of the two terminals.

The invention also provides a mass simulator comprising a device according to the above definitions.

The present invention also provides a mechanical damping system, such as a system within a car suspension, employing a device as defined above.

The invention also provides a method for vibration absorption, employing a device as defined above.

BRIEF DESCRIPTION OF THE DRAWINGS

Examples of the present invention will now be described with reference to the accompanying drawings, in which.

DETAILED DESCRIPTION

Figure 1:
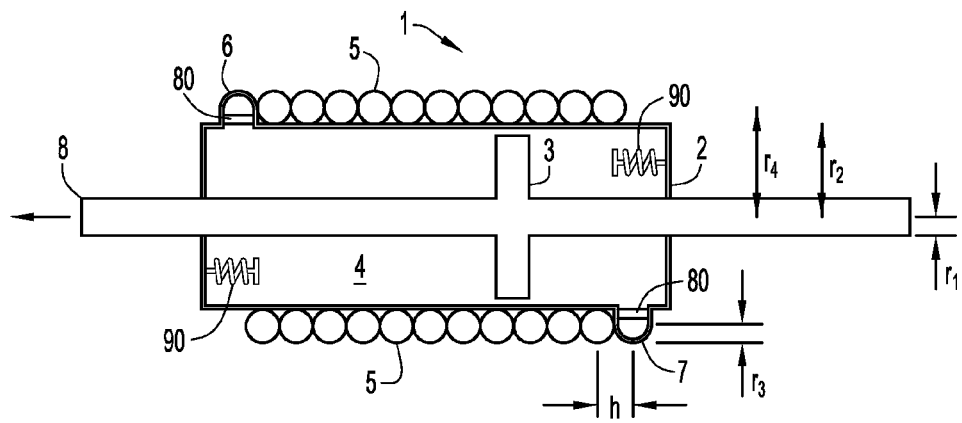
FIG. 1 is a schematic view of an exemplary embodiment of the force-controlling hydraulic device according to the present invention.
Figure 2:
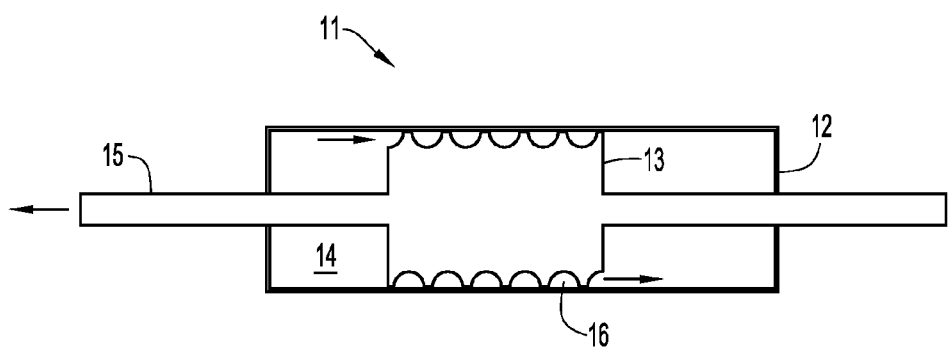
FIG. 2 is a schematic view of another exemplary embodiment of the force-controlling hydraulic device according to the present invention.

Two prototypes were built and tested, one provided with a coil external to the cylinder as in FIG. 1 and using water as fluid, the other with an internal helical path shaped in the piston itself as shown in FIG. 2 and using hydraulic fluid.

FIG. 1 illustrates an example of a force-controlling hydraulic device 1 according to the present invention. The device 1 comprises a cylinder 2, a piston 3 movable within the cylinder, and a liquid 4 within the cylinder. The device further comprises a helical tube 5 located outside the cylinder creating a sealed path for the liquid to flow out and back into the cylinder via two orifices (6, 7). Movement of the piston 3 causes liquid 4 to flow through helical tube 5 which generates an inertial force due to the moving mass of the liquid. The cylinder may include one terminal, and the piston may include another terminal. As will be explained below, the inertial force due to a moving mass of liquid caused by relative movement between the terminals controls the mechanical forces at the terminals such that they are substantially proportional to the relative acceleration between the terminals.

The motion of the piston 3 may be restricted by devices such as spring buffers 90. Such means may provide a useful safety feature to protect the device if large forces or velocities were generated at the limits of travel of the piston.

The device of FIG. 1 is implemented using a through-rod 8. Alternatives using a single rod with a floating piston or a double tube or other similar arrangements are equally feasible. Means to pressurize the fluid (not shown) are envisaged.

FIG. 2 illustrates another example of a force-controlling hydraulic device 11 according to the present invention. The device 11 comprises a cylinder 12, a piston 13 movable within the cylinder, and a liquid 14 within the cylinder. The outer surface of the piston 13 has a helical channel, such that, when inserted inside the cylinder, a helical path 16 is formed between the piston and the cylinder. Movement of the piston 13 causes liquid 14 to flow through helical path 16 which generates an inertial force due to the moving mass of the liquid inside the cylinder. In the example of FIG. 2 the helical path 16 has a cross-section which is a semi-disc which is convenient for machining Other cross-sectional shapes may also be employed with advantage to control the damping characteristics of the device. The example of FIG. 2 is implemented using a through-rod 15.

In the example shown in FIG. 1, the characteristic parameters of device 1, namely the constant of proportionality with which the applied force at the terminals is related to the relative acceleration between the terminals, can be varied by altering values such as the radii of the piston, cylinder, and helical tube, the length of the cylinder, and liquid density. The effect of such parameters will be detailed below.

Consider the arrangement shown in FIG. 1, where $r_1$ is the radius of the through-rod, $r_2$ is the inner radius of the cylinder, $r_3$ is the inner radius of the helical tube, $r_4$ is the radius of the helix, h is the pitch of the helix, n is the number of turns in the helix, L is the inner length of the cylinder, and $\rho$ is the liquid density. Further, $$\rho n \pi r_3^2 \sqrt{h^2 + (2\pi r_4)^2} =: m_{hel.} \qquad (1)$$

The total mass of liquid in the cylinder is approximately equal to:

$$\rho \pi (r_2^2 - r_1^2) L =: m_{cyl.} \qquad (2)$$

If the piston is subject to a linear displacement equal to x, then a fluid element in the helical tube may expect an angular displacement $\theta$ (rads) approximately equal to:

$$\frac{2\pi x (r_2^2 - r_1^2)}{r_3^2 \sqrt{h^2 + (2\pi r_4)^2}}. \qquad (3)$$

The moment of inertia of the total liquid mass in the helical tube about the axis of the piston is approximately equal to $m_{hel} r_4^2 =: J$. Now suppose that device 1 has an ideal behavior with b representing the proportionality constant wherein the generated inertial force between the terminals is proportional to the relative acceleration between the terminals. Then we would expect:

$$\frac{1}{2} b \dot{x}^2 = \frac{1}{2} J \dot{\theta}^2 \qquad (4)$$

which gives $$b = \frac{m_{hel}}{1 + (h/(2\pi r_4))^2} \frac{(r_2^2 - r_1^2)^2}{r_3^4} = \frac{m_{hel}}{1 + (h/(2\pi r_4))^2} \left(\frac{A_1}{A_2}\right)^2 \qquad (5)$$

Let $m_{tot} = m_{hel} + m_{cyl}$ for the total liquid mass. Exemplary values are tabulated below for two different liquids used in the embodiment shown in FIG. 1. In the following examples it was assumed that $r_4 = r_2 + r_3$, $h = 2r_3$ and $L = nh$. The outside diameter (OD) of the device was taken to be equal to $2(r_4 + r_3)$.

TABLE 1

A synthetic oil with $\rho = 1200$ kg m$^{-3}$.

| $r_1$ (mm) | $r_2$ (mm) | $r_3$ (mm) | n | OD (mm) | L (mm) | $m_{hel}$ (kg) | $m_{cyl}$ (kg) | $m_{tot}$ (kg) | b (kg) |
|---|---|---|---|---|---|---|---|---|---|
| 6 | 30 | 3 | 15 | 72 | 90 | 0.106 | 0.293 | 0.399 | 972.1 |
| 6 | 25 | 3 | 20 | 62 | 120 | 0.119 | 0.267 | 0.386 | 511.0 |
| 6 | 30 | 6 | 10 | 84 | 120 | 0.307 | 0.391 | 0.698 | 176.6 |
| 6 | 20 | 4 | 20 | 56 | 160 | 0.182 | 0.220 | 0.402 | 94.0 |
| 6 | 24 | 5 | 10 | 68 | 100 | 0.172 | 0.204 | 0.376 | 80.0 |
| 6 | 20 | 4 | 12 | 56 | 96 | 0.109 | 0.132 | 0.241 | 56.4 |

TABLE 2

Mercury with $\rho = 13579$ kg m$^{-3}$.

| $r_1$ (mm) | $r_2$ (mm) | $r_3$ (mm) | n | OD (mm) | L (mm) | $m_{hel}$ (kg) | $m_{cyl}$ (kg) | $m_{tot}$ (kg) | b (kg) |
|---|---|---|---|---|---|---|---|---|---|
| 6 | 20 | 4 | 12 | 56 | 96 | 1.24 | 1.49 | 2.73 | 638.4 |
| 5 | 15 | 3 | 20 | 42 | 120 | 0.87 | 1.02 | 1.89 | 428.3 |
| 5 | 10 | 2 | 30 | 28 | 120 | 0.39 | 0.38 | 0.77 | 135.5 |
| 5 | 7 | 1 | 60 | 18 | 120 | 0.13 | 0.12 | 0.25 | 74.0 |

$A_1 = \pi(r_2^2 - r_1^2)$ is the cross-sectional area of the cylinder, and
$A_2 = \pi r_3^2$; is the cross-sectional area of the tube.
The total mass of liquid in the helical tube is approximately equal to:

As shown in Tables 1 and 2, the modeling and testing work demonstrated that the produced inertance effect (force proportional to acceleration) could be sufficiently large (the proportionality constant b is greater than 50 kg). Such effect would be needed where the device is placed in parallel with a spring and damper.

Furthermore, the modeling and testing demonstrated that the viscosity of the liquid provides a departure from ideal behavior. A further parasitic element might be provided by the compressibility of the fluid which might be modeled as a spring in series with the two parallel elements.

In U.S. Pat. No. 7,316,303, an ideal device is defined (i.e., the force proportional to relative acceleration) and deviations caused by friction, backlash etc. are regarded as parasitics which can be made as small as needed so that the essential function of the device is achieved. In the case of the present invention however, the non-linear damping caused by liquid viscosity is intrinsic, and will cause a deviation from ideal behavior at large piston velocities.

The non-linear damping intrinsic to the present invention is "progressive", namely the force increases with a relative velocity at a faster rate than linear. Practical dampers in automotive applications are often regressive, namely the force increases with a relative velocity at a slower rate than linear. Even when using ordinary liquids such as hydraulic fluids, the device according to the present invention can be configured to display an ideal behavior, using adjusting means 80. For example, shim packs at the orifices 6, 7 could be employed to achieve a more linear damping characteristic, although this would leave a non-negligible parallel damper. This has the potential to create a convenient integrated device with the behavior of an ideal device according to the present with a linear damper in parallel. In other circumstances it may be advantageous not to correct for the viscosity effect.

The following details the effects of damping. Let u be the mean velocity of fluid in the helical tube, $\Delta p$ the pressure drop across the piston $\mu$ the liquid viscosity, and l the length of the helical tube, where $$l = n\sqrt{(h^2 + (2\pi r_4)^2)} \quad (6)$$

The pressure drop $\Delta p$ across the main piston required to maintain a flow in the tube of mean velocity u will now be calculated. This will allow the steady force required to maintain a piston relative velocity $\dot{x}$ to be calculated, and hence a damping coefficient.

Given that $A_1 \dot{x} = A_2 u$, the Reynolds Number (Re) for the tube is equal to $$(Re) = \frac{2\rho r_3}{\mu} u = \frac{2\rho r_3 A_1}{\mu A_2} \dot{x} \quad (7)$$

with transition from laminar to turbulent flow occurring around $(Re) = 2 \times 10^3$.

Assuming that u is small enough so that laminar flow holds, and using the Hagen-Poiseuille formula for a straight tube gives:

$$u = \frac{r_3^2}{8\mu} \frac{\Delta p}{l} \quad (8)$$

The force on the piston required to maintain a steady relative velocity $\dot{x}$ is equal to $\Delta p A_1$. This suggests a linear damping rate coefficient equal to:

$$c = \frac{\Delta p A_1}{\dot{x}} = \frac{\Delta p A_1^2}{A_2 u} = \left(\frac{A_1}{A_2}\right)^2 8\pi \mu l. \quad (9)$$

The pressure drop needed to maintain a turbulent flow, according to Darcy's formula is:

$$\Delta p = \frac{1}{r_3} f \rho u^2, \quad (10)$$

where f is a dimensionless friction factor. For a smooth pipe the empirical formula of Blasius is:

$$f = 0.079 (Re)^{-1/4}. \quad (11)$$

This gives the following expression for the constant force on the piston required to maintain a steady velocity:

$$F = \Delta p \, A_1 \quad (12)$$

$$= 0.0664 \mu^{0.25} \rho^{0.75} \frac{l A_1}{(r_3)^{1.25}} u^{1.75}$$

$$= 0.664 \mu^{0.25} \rho^{0.75} \frac{l A_1}{r_3^{1.25}} \left(\frac{A_1}{A_2}\right)^{1.75} (\dot{x})^{1.75} =: c_1 (\dot{x})^{1.75}$$

Let the fluid be water with $\rho = 100$ kg m$^{-3}$, $\mu = 10^{-3}$ Pa s. Take $l = 7$ m, $r_1 = 8$ mm, $r_2 = 20$ mm, $r_3 = 4$ mm, L=300 mm. This results in a device with:

$m_{hel} = 0.352$ kg,
$m_{cyl} = 0.317$ kg, and
b=155 kg.

The transition to turbulent flow occurs at a piston velocity of $\dot{x} = 0.0119$ m s$^{-1}$ at velocities consistent with laminar flow, the damper rate is c=77.6 N s m$^{-1}$.

Figure 3:
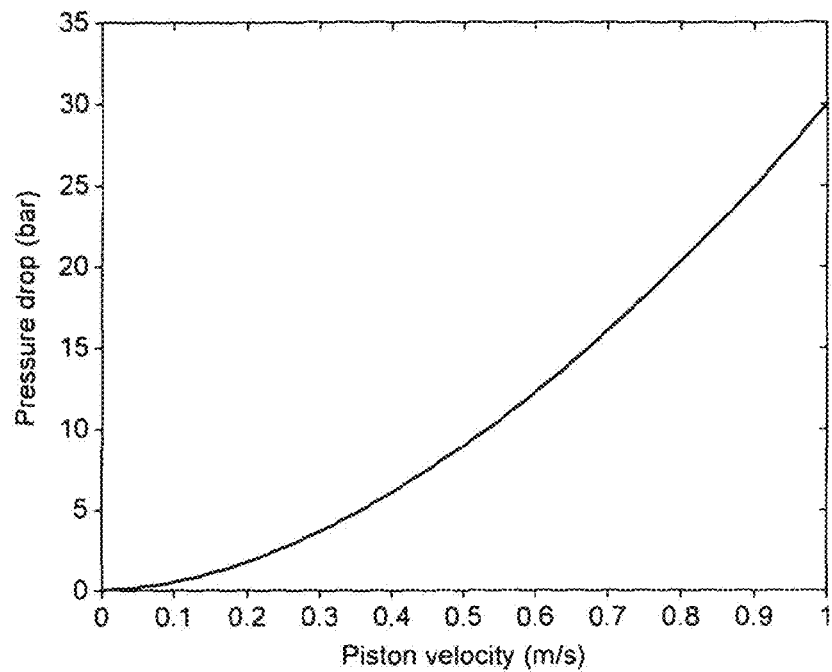
FIG. 3 shows the pressure drop across the device of FIG. 1 as a function of (constant) piston velocity.
Figure 4:
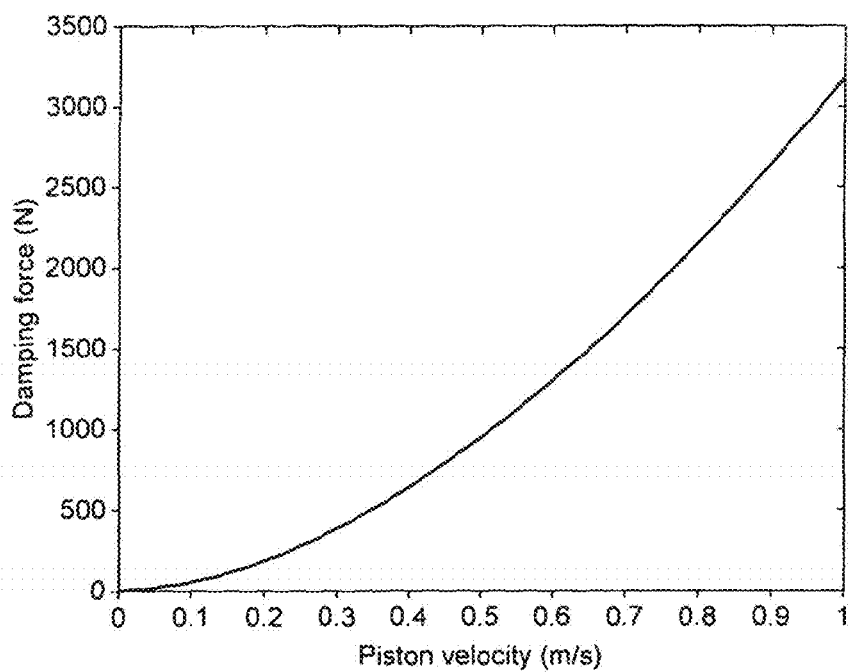
FIG. 4 shows the damping force on the piston of the device of FIG. 1 as a function of (constant) piston velocity.

The pressure drop and linear force in conditions of turbulent flow are shown in FIG. 3 and FIG. 4, respectively.

If $r_1$, $r_2$ and $r_3$ are all increased by a factor of 2 and l is reduced by a factor of 4 and then $m_{hel}$ and b are left unchanged, $m_{cyl}$ is increased by a factor of 4 and the damping force in turbulent flow is reduced by a factor of $2^{1.25} = 2.38$.

The helical tube shown in FIG. 1 may be replaced in other embodiments of the invention with different shaped tubes. Furthermore, the liquid path may be provided inside the cylinder, with the piston being shaped to provide for example a helical liquid flow path or several concentric helices. Clearances around the piston may also be employed to provide the flow path inside the cylinder. In practice, the best results appear to be achieved by a helical flow path.

For automotive suspension applications, an embodiment of the present invention in parallel with the regular spring and a damper is advantageous if the suspension is relatively stiff. For ordinary passenger cars, the parallel configuration may need to be combined with other series elements.

What is claimed is:
1. A device for use in the control of mechanical forces, the device comprising:
   first and second terminals for connection to components in a system for controlling mechanical forces and independently moveable; and
   a hydraulic device connected between the terminals and containing a liquid, the hydraulic device comprising:
     a housing attached to one of the first and second terminals and defining a chamber for containing the liquid;
     a piston attached to the other one of the first and second terminals and being moveable within the chamber such that the movement of the piston causes the liquid to flow along at least one flow path; and
   wherein the hydraulic device stores energy in the moving fluid upon relative movement of the terminals, producing an inertial force upon changes in the relative velocity of the first and second terminals due to the liquid flow and mass of the liquid to control the mechanical forces at the first and second terminals to be substantially proportional to the relative acceleration between the first and second terminals.

2. The device according to claim 1, wherein the at least one flow path is helical.

3. The device according to claim 1, wherein the at least one flow path is provided outside the chamber.

4. The device according to claim 1, wherein the at least one flow path is provided inside the chamber.

5. The device according to claim 1, wherein the device further comprises:
   an adjusting mechanism to control the mechanical forces at the terminals such that a desired damping characteristic is provided in addition to the proportionality to the relative acceleration between the terminals.

6. The device according to claim 1, wherein the device further comprises a limiter device to restrict the extent of relative movement of the first and second terminals.

7. A mass simulator comprising the device of claim 1.

8. A mechanical damping system comprising the device of claim 1.

9. The mechanical damping system according to claim 8, wherein the mechanical damping system is a mechanical damping system of a car suspension.

10. The mechanical damping system according to claim 8, wherein the device is configured such that neither of the first and second terminals is connected to a fixed point.

11. A vehicle suspension system comprising the device of claim 1.

12. A method for vibration absorption, comprising:
   connecting first and second independently moveable terminals to components in a system for controlling mechanical forces; and
   connecting a hydraulic device between the terminals that defines a chamber containing a liquid;
   applying the mechanical forces across the terminals to displace a piston received in the chamber of the hydraulic device to store energy in the moving fluid upon relative movement of the terminals, producing an inertial force upon changes in the relative velocity of the first and second terminals due to the liquid flow and mass of the liquid to control the mechanical forces at the terminals to be substantially proportional to the relative acceleration between the terminals.

* * * * *